US010216624B1

(12) United States Patent
Tiotantra et al.

(10) Patent No.: US 10,216,624 B1
(45) Date of Patent: Feb. 26, 2019

(54) TWO-PASS LOGICAL WRITE FOR INTERLACED MAGNETIC RECORDING

(71) Applicant: Seagate Technology LLC, Cupertino, CA (US)

(72) Inventors: Harry Tiotantra, Singapore (SG); TzePin Chin, Singapore (SG); Kai Chen, Singapore (SG); WenXiang Xie, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/039,677

(22) Filed: Jul. 19, 2018

Related U.S. Application Data

(63) Continuation-in-part of application No. 15/823,233, filed on Nov. 27, 2017, now Pat. No. 10,163,462.

(51) Int. Cl.
G11B 20/12 (2006.01)
G06F 12/02 (2006.01)
G06F 12/0873 (2016.01)
G06F 3/06 (2006.01)

(52) U.S. Cl.
CPC .......... *G06F 12/0238* (2013.01); *G06F 3/064* (2013.01); *G06F 3/0613* (2013.01); *G06F 3/0656* (2013.01); *G06F 3/0676* (2013.01); *G06F 12/0873* (2013.01); *G11B 20/1217* (2013.01); *G06F 2212/1016* (2013.01); *G06F 2212/21* (2013.01); *G06F 2212/281* (2013.01); *G06F 2212/462* (2013.01); *G11B 2020/1238* (2013.01)

(58) Field of Classification Search
CPC ....... G11B 5/4866; G11B 5/314; G11B 7/126; G11B 11/10595; G11B 2005/0021; G11B 5005/0001; G11B 20/12
USPC .... 360/48, 31, 83, 40, 53; 369/275.3, 47.14, 369/47.44, 47.23
See application file for complete search history.

(56) References Cited

U.S. PATENT DOCUMENTS

| 7,016,597 | B2 | 3/2006 | Gotoh et al. |
| 9,508,362 | B2* | 11/2016 | Gao .......................... G11B 5/09 |
| 9,508,369 | B2 | 11/2016 | Chu et al. |
| 2016/0147650 | A1 | 5/2016 | Gao et al. |

* cited by examiner

Primary Examiner — Nabil Z Hindi
(74) Attorney, Agent, or Firm — Holzer Patel Drennan

(57) ABSTRACT

An exemplary write method disclosed herein includes receiving a request to write data to a consecutive sequence of logical block addresses (LBAs); identifying a first non-contiguous sequence of data tracks mapped to a first portion of the consecutive sequence of LBAs; and identifying a second non-contiguous sequence of data tracks mapped to a second portion of the consecutive sequence of LBAs, where the second portion sequentially follows the first portion. The method further includes writing the data of the second portion of the consecutive sequence of LBAs to the first non-contiguous sequence of data tracks during a first pass of a transducer head through the radial zone and writing the data of the first portion of the consecutive sequence of LBAs to the second non-contiguous sequence of data tracks during a second, subsequent pass of the transducer head through the radial zone.

20 Claims, 6 Drawing Sheets

US 10,216,624 B1

TWO-PASS LOGICAL WRITE FOR INTERLACED MAGNETIC RECORDING

PRIORITY CLAIM

This application is a continuation-in-part application of U.S. Non-Provisional patent application Ser. No. 15/823,233, entitled "Two-Pass Logical Write for Interlaced Magnetic Recording" and filed on Nov. 27, 2017, which is incorporated by reference for all that it discloses and teaches.

BACKGROUND

Interlaced magnetic recording (IMR) is a storage technique that utilizes different track widths when writing alternating data tracks on a storage medium. For example, every-other track is written to have a wide track width, and the alternating, interlaced tracks are written with a comparably narrower width. In some IMR systems, the tracks are spaced such that each one of the narrow (top) tracks overlaps and overwrites a small portion of the edges of the immediately adjacent wider (bottom) tracks. For this reason, the narrow data tracks in IMR are often referred to as "top tracks" while the wider data tracks are referred to as "bottom tracks." Track progression rules may prohibit data from being written to a narrow (top) IMR tracks until data is first stored on the two contiguous (physically adjacent) bottom data tracks of the wider track width.

In some implementations, IMR devices utilize a higher bit density when writing the wider (bottom) data tracks than the narrower (top) data tracks. As a result of this variable bit density, the variable track width, and the overlap between edges of adjacent tracks, a higher total areal density can be realized in IMR systems than that attainable in systems that implement the same magnetic recording type without utilizing alternating tracks of variable width and linear density.

BRIEF DESCRIPTIONS OF THE DRAWINGS

SUMMARY

Implementations disclosed herein provide systems and methods for writing data according to an interlaced magnetic recording data management scheme. According to one implementation, a method includes receiving a request to write data to a consecutive sequence of logical block addresses (LBAs); identifying a first non-contiguous sequence of data tracks mapped to a first portion of the consecutive sequence of LBAs; and identifying a second non-contiguous sequence of data tracks mapped to a second portion of the consecutive sequence of LBAs. The method further includes writing the data of the second portion of the consecutive sequence of LBAs to the first non-contiguous sequence of data tracks during a first pass of a transducer head through the radial zone and writing the data of the first portion of the consecutive sequence of LBAs to the second non-contiguous sequence of data tracks during a second, subsequent pass of the transducer head through the radial zone.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description. [[This summary is intentionally limited to the language of the broadest independent claim]].

DETAILED DESCRIPTION

In many storage devices, logical block addresses (LBAs) are mapped to consecutive, contiguous data tracks. The term "contiguous" is used herein to imply physical contact such that two data tracks are "contiguous" when they are physically adjacent and touching one another (e.g., sharing a border). In traditional magnetic storage systems, highest read and write throughput is observed when LBAs are mapped in a consecutive LBA order to sequential contiguous tracks. In interlaced magnetic recording (IMR) systems, however, this type of mapping may negatively affect write throughput as a result of track progression rules that conditionally restrict the order in which data tracks may be written.

Figure 1:
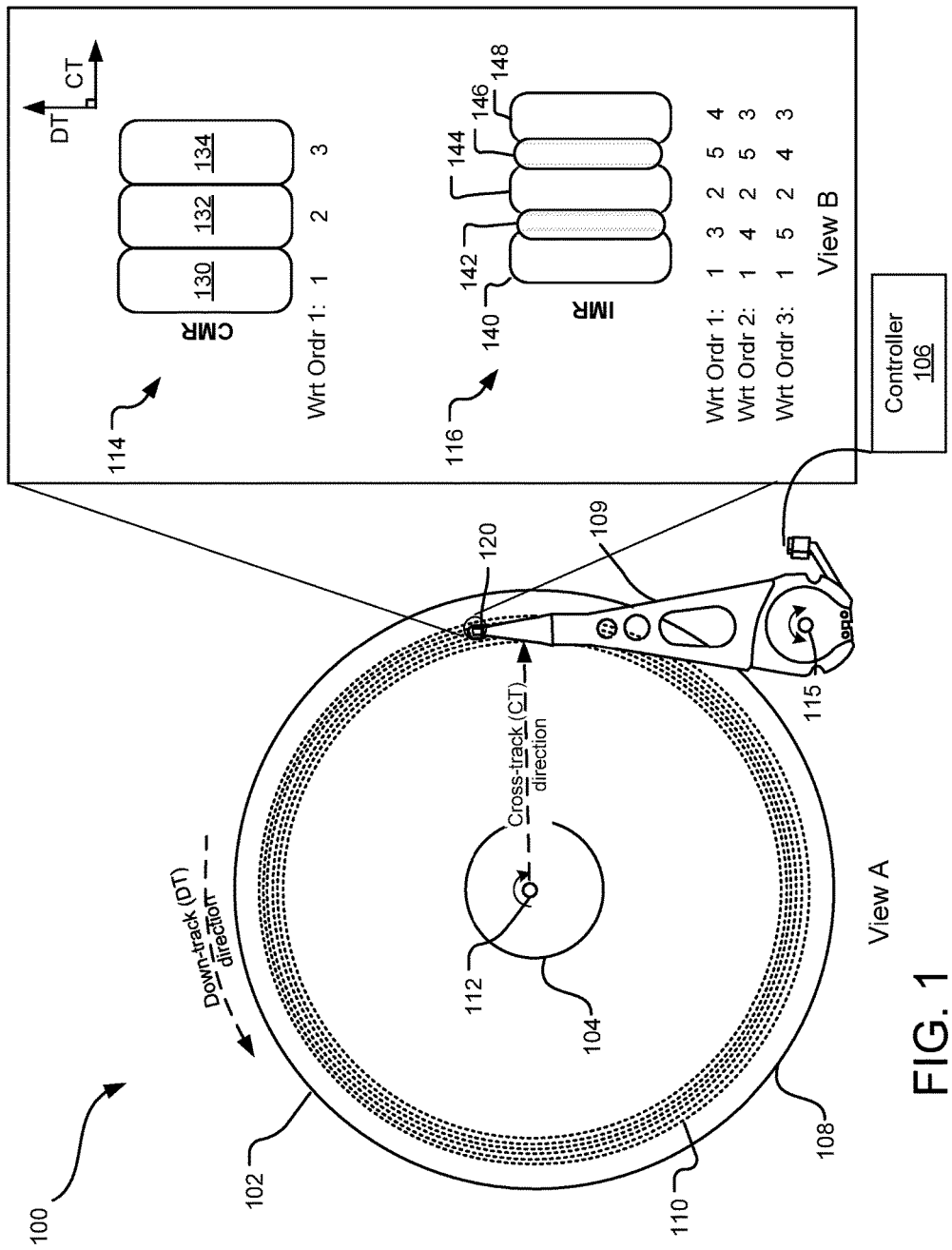
FIG. 1 illustrates an example data storage device that implements a performance-efficient logical block address (LBA) mapping scheme designed to maximize forward progression of a transducer head while data is logically written according to an interlaced magnetic recording (IMR) data management scheme.

FIG. 1 illustrates an example storage device 100 that implements a performance-efficient logical block address (LBA) mapping scheme designed to maximize write and/or read throughput when implementing an interlaced magnetic recording (IMR) data management scheme. According to one implementation, the storage device 100 writes a grouping of adjacent tracks in an order that mitigates total seek times for the group while also permitting "in-order" writes of data. As used herein, a write operation is "in-order" or according to a "forward LBA progression" when data is written to physical data blocks that are physically arranged to strictly correspond to a consecutive LBA sequence. For example, data of LBAs 0-9 is logically written when the LBAs are written in the order 0, 1, 2, 3, 4, 5, 6, 7, 8, 9.

In FIG. 1, the storage device 100 includes a transducer head assembly 120 for writing data on a magnetic storage medium 108. Although other implementations are contemplated, the magnetic storage medium 108 is, in FIG. 1, a magnetic storage disc on which data bits can be recorded using a magnetic write pole (not shown) and from which data bits can be read using a magnetoresistive element (not shown). As illustrated in View A, the magnetic storage medium 108 rotates about a spindle center or a disc axis of rotation 112 during rotation, and includes an inner diameter 104 and an outer diameter 102 between which are a number of concentric data tracks 110. Information may be written to and read from data bit locations in the data tracks on the magnetic storage medium 108.

The transducer head assembly 120 is mounted on an actuator arm 109 at an end distal to an actuator axis of rotation 115. The transducer head assembly 120 flies in close proximity above the surface of the magnetic storage medium 108 during disc rotation. The actuator arm 109 rotates during a seek operation about the actuator axis of rotation 112 to position the transducer head assembly 120 over a target data track for each read and write operation of the storage device 100. The transducer head assembly 120 includes at least one write element (not shown) including a write pole for converting an electrical signal sent from a controller 106 into a magnetic signal of commensurate length. The magnetic pulses of the write pole selectively magnetize magnetic grains of the rotating magnetic media 108 as they pass below the pulsating write element.

View B illustrates magnified views 114 and 116 illustrating a same surface portion of the magnetic storage medium 108 according to different write methodologies and settings of the storage device 100. The magnified view 114 illustrates a series of data tracks 130, 132, and 134 written according to a conventional magnetic recording (CMR) technique. Under CMR, all data tracks are written to have a substantially equal track width. In CMR, each of the tracks is "randomly writable," meaning that each data track, or a portion of each track, can be individually re-written multiple times without significantly degrading data on other adjacent data tracks. An adjacent data track is "significantly degraded" if reading the data track results in a number of read errors in excess of a maximum number of errors that can be corrected by an error correction code (ECC) or forward erasure code (FEC) of the storage device 100. Since the data tracks are randomly writable when CMR techniques are utilized, tracks may be written in any order without risk of degrading data on adjacent tracks.

When data is written according to the above-described CMR technique, highest throughput is attained by writing data in-order to sequential, consecutive data tracks, as this tends to minimize total seek time during which the actuator arm 109 is moving to position the transducer head assembly 120 on different tracks. For this reason, CMR systems typically implement an LBA mapping scheme that is consecutive on contiguous tracks. For example, the data tracks 130, 132, and 134 may be written in a sequential consecutive order such that a first portion of a consecutive LBA sequence is written to the data track 130, a second consecutive portion of the consecutive LBA sequence is written to the data track 132, and a third consecutive portion of the consecutive LBA sequence is written to the data track 134.

While interlaced magnetic recording (IMR) systems can provide higher areal storage densities than CMR systems, IMR systems typically implement certain track progression rules that prohibit data tracks from being written in a sequential consecutive order, as discussed above. As a result, traditional LBA mappings yield reduced write throughput when implemented in IMR systems.

According to one implementation, the storage device 100 implements an IMR write scheme that reduces total seek times while also facilitating a strict, forward LBA progression within a given radial zone of the magnetic storage medium 108. An example of this IMR write scheme is shown in magnified view 116 of FIG. 1, which illustrates a series of data tracks 140, 142, 144, 146, and 148. IMR systems typically include alternating data tracks of different written track widths arranged with slightly overlapping edges so that a center-to-center distance between directly adjacent tracks (e.g., the nominal track pitch) is uniform across the surface of the magnetic storage medium 108. The alternating data tracks shown in the magnified view 116 are of two different written track widths. A first series of alternating tracks (e.g., tracks 140, 144, and 148) have a wider written track width than a second series of interlaced data tracks (e.g., 142 and 146). Each of the interlaced data tracks with the narrower track width (e.g., 142 and 146) has edge portions that overlap and overwrite edge portions of the adjacent wider data tracks. For example, edge portions of the wide data tracks 140 and 144 are overwritten by a narrower data track 142.

In one implementation, the controller 106 implements a track progression rule that prevents a narrow data track from receiving data before data is written to both of the directly-adjacent wider data tracks. For example, the data tracks 140 and 144 are initially written before the data track 142. So long as the narrow tracks are written after the adjacent wider tracks (as shown), all data tracks remain readable. Notably, however, the data tracks 140 and 144 are not randomly writeable after the initial fill. For example, an update to the data track 144 may entail reading the immediately-adjacent tracks 142 and 146 into memory, updating the data track 144, and then re-writing the tracks 142 and 146 from memory.

There are multiple different orders in which a radial zone of tracks may be filled in-order with data while complying with the above-described track progression write rules. In FIG. 1, three different suitable track progression write schemes are indicated ("wrt ordr 1," "wrt ordr 2," and "wrt ordr 3"). Each of these track progression write schemes is indicted by annotated numbers 1-5, indicating an order in which the associated tracks are written relative to one another. Notably, all three of the illustrated track progression write schemes obey a same rule preventing a narrow data track (e.g., the data tracks 142 and 146) from receiving data until after data is written to the wider data tracks immediately-adjacent to the narrow data track. As explained below, the different illustrated track progression write schemes ("wrt ordr 1," "wrt ordr 2," and "wrt ordr 3") may correlate with different degrees of write throughput when used to write a group of adjacent tracks while leaving random updates of individual tracks largely similar.

One factor influencing performance efficiency is the number of times that the actuator arm 109 performs a "inter-layer seek". As used herein, the term "inter-layer seek" refers to a seek of the transducer head assembly 120 from a position to access a data track of one written width to a position to access another data track of a different written width (e.g., a seek from an IMR top track to an IMR bottom track or, alternatively, from an IMR bottom track to an IMR top track). Inter-layer seeks between adjacent tracks require more time than adjacent track seeks between data tracks of the same layer (e.g., between two top tracks or two bottom tracks). When, for example, the actuator arm 109 moves the transducer head from an IMR bottom track (e.g., the data track 144) to an IMR top track (e.g., the data track 142), additional delays may be incurred as compared to track seeks between data tracks of equal track width.

One factor that increases delay in inter-layer seek operations is a re-loading of read/write adaptive parameters that must occur when changing the write track width of the transducer head assembly 120. If the storage device 100 is an energy-assisted magnetic recording device (e.g., heat-assisted magnetic recording (HAMR) device or microwave-assisted magnetic recording (MAMR)), the energy source power is altered to increase or decrease the effective write track width of the write elements, further contributing to delay time. Other non-HAMR devices utilize different writers (rather than variable heat source power) or different write heater currents to achieve variable track width. In these devices, extra "settling time" may be observed when seeking between tracks of different width to position the head over the new target data track and to adjust to the new fly height. Thus, extra settling time, parameter re-loading, fly height changes, and energy source power alteration are all example effects that may increase delays observed when two tracks of different width are written consecutively. Track progression write schemes with fewer inter-layer seeks therefore generally allow the storage device 100 to perform more efficiently (e.g., to deliver faster read and write I/O) than track progression write schemes with larger numbers of inter-layer seeks.

According to the first track write progression scheme ("wrt ordr 1") of FIG. 1, nearly every other track write induces an inter-layer seek for a sequential fill. For example, the two bottom tracks 140, 144, are written consecutively, followed by an interlaced top track 142. The seek between the data track 144 and the data track 142 is an example inter-layer seek. After the top track 142 is written, data is next directed to a bottom data track 148. This is another example of an inter-layer seek. Finally, the top track 146 receives data after the bottom track 148. This is a third example of an inter-layer seek.

According to the second track progression write scheme ("wrt ordr 2") and the third track progression write scheme ("wrt ordr 3"), all of the bottom data tracks in a radial zone are written before any top tracks, inside a format unit known as a radial zone. For example, in the second track progression write scheme, the actuator arm 109 seeks from left to right, filling exclusively the bottom tracks 140, 144, and 148 in a forward-progression write (e.g., a consecutive track order) before seeking back to the left and filling the top tracks 142 and 146 in another forward-progression write in the same left-to-right direction. The third track progression write scheme similarly writes data sequentially to the consecutive bottom tracks 140, 144, and 148 before seeking back in the opposite (e.g. right-to-left) direction to fill top tracks 146 and 142.

Notably, each of the second and third track progression write schemes can fill an entire radial zone, regardless of the number of data tracks, with a pair of forward-progression writes abridged by a single inter-layer seek operation (e.g., the switch between the last bottom track and the first top track to receive data). Since the second and third write ordering schemes can be implemented with a fewest amount of inter-layer seeks (e.g., one as compared to many), the second and third track progression write schemes generally yield higher sequential read and write throughput performance of the storage device 100. In some implementations, the illustrated track progression write schemes may be reversed from the ordering shown, at each layer. For example, the bottom tracks may be filled in a right-to-left direction to achieve similar performance advantages.

According to one implementation, a first portion of a consecutive LBA sequence is mapped to a series of IMR bottom tracks and a second (e.g., latter) portion of the consecutive LBA sequence is mapped to the series of top IMR tracks. For example, the first portion of the LBA sequence is mapped consecutively to consecutive bottom tracks in a radial zone and the second portion of the LBA sequence is mapped consecutively to consecutive top tracks in the radial zone. Consequently, data can be accessed in-order from the series of bottom tracks when these tracks are accessed in a consecutive track order, even though these tracks are non-contiguous (e.g., not physically sharing boundaries with one another). Likewise, data can be accessed logically from the series of top tracks when these tracks are accessed in a consecutive track order during another forward progression write.

The above-described LBA mapping and forward-progression write techniques permit an entire radial zone of the storage device to be accessed logically when the transducer head assembly 120 performs a two-pass "sweep" of the zone, such as to write all bottom tracks in the zone on the first sweep (a first forward-progression write) and to write all top tracks in the zone on the second sweep (a second forward-progression write). This mitigates the total time for writing data to fill a radial zone by writing tracks according to a forward LBA progression while implementing a track progression scheme that limits the number of inter-layer seeks to one (e.g., a single track switch between a bottom track and a top track).

The controller 106 may include hardware and/or software stored on a computer-readable storage media that is a tangible article of manufacture. As used herein, the term tangible computer-readable includes, but is not limited to, RAM, ROM, EEPROM, solid state memory (e.g., flash memory), CDROM, digital versatile disks (DVD) or other optical disk storage, magnetic cassettes, magnetic tape, magnetic disk storage or other magnetic storage devices, or any other tangible medium which can be used to store the desired information, and which can be accessed by a computer. In contrast to tangible computer-readable storage media, intangible computer-readable communication signals may embody data resident in a modulated data signal, such as a carrier wave or other signal transport mechanism.

Figure 2:
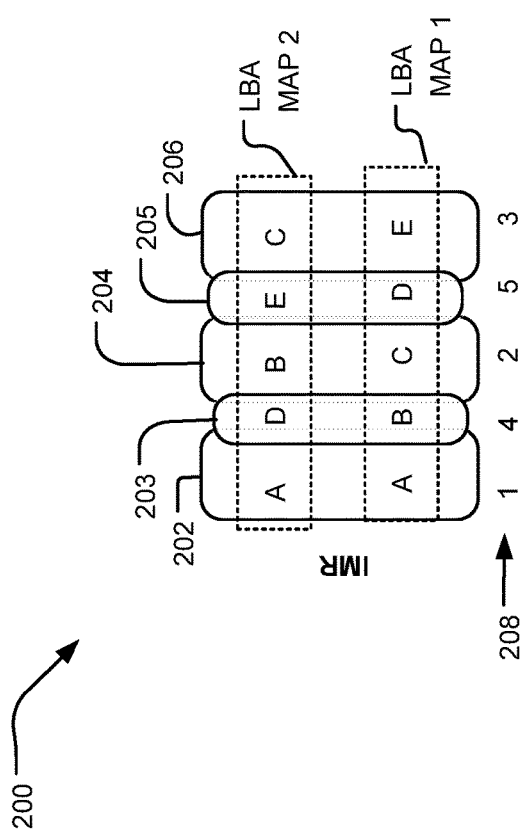
FIG. 2 illustrates examples of LBA mapping schemes suitable for use in an IMR system.

FIG. 2 illustrates examples of LBA mapping schemes suitable for use in an IMR system 200. Specifically, FIG. 2 illustrates a grouping of data tracks (202, 203, 204, 205, and 206), which may be representative of a radial zone on a magnetic storage medium. The grouping of data tracks includes IMR bottom tracks 202, 204, and 206, and IMR top tracks 203 and 205. The IMR bottom tracks 202, 204, and 206 have a slightly wider written track width than the IMR top tracks 203 and 205. In addition, the IMR top tracks 203 and 205 are arranged to have edges slightly overlapping the adjacent IMR bottom tracks. For example, the IMR top track 203 has edges that overlap edges of the IMR bottom tracks 202 and 204.

In one implementation, a storage device controller implements a track progression write scheme that fills all of the IMR bottom tracks (e.g., the IMR bottom tracks 202, 204, and 206) in a radial zone before writing data to any of the top tracks of the radial zone). An example track progression write scheme 208 is indicated below the data tracks in FIG. 2, whereby the IMR bottom tracks 202, 204, and 206 are written sequentially followed by sequential writes of the two IMR top tracks 203 and 205.

Two exemplary LBA mapping schemes—LBA Map 1 and LBA Map 2—are shown. In FIG. 2, the letters A-E each represent a group of in-order LBAs that are in-order such that the extent of LBAs A, B, C, D, and E, collectively, represent an in-order write.

LBA Map 1 illustrates a mapping similar to LBA mapping schemes employed in traditional CMR systems. When such a mapping is utilized in conjunction with the track progression write scheme 208, however, the track progression write scheme 208 prevents the sequential in-order write of the LBA sequence A-E. Rather, the track progression write scheme 208 causes the LBAs to be sequentially written out-of-order: A, C, E, B, D.

Writing LBAs out-of-order in this manner can contribute to performance degradation through, for example, excess processing overhead, excess DRAM buffering of the data for tracks which may not yet be written (e.g. tracks 203 and 205) resulting in a loss of read and write caching resources, receiving data out of the IMR track progression order resulting in host data for the next track to be written arriving too late (e.g. after writing track 202, the storage device next receives data for track 203 when it is to begin writing track 204) and host interrupts that may occur. When, for example, a host-initiated write command targets a consecutive LBA sequence, the controller may perform 'work' to determine an appropriate non-consecutive LBA order in which to write the targeted LBA sequence so as to ensure compliance with the IMR track progression write rules.

In contrast, the second LBA mapping scheme, LBA Map 2, improves write throughput by allowing data to be written according to a forward LBA progression while still in accordance with IMR track progression write rules. Specifically, the LBA map 2 maps the LBAs A-C to consecutive IMR bottom tracks while mapping LBAs D-E to consecutive IMR top tracks. This LBA ordering scheme mimics the track progression write scheme 208 such that data is read or written in-order as the data tracks are filled with data. This LBA mapping maintains the in-order write paradigm integral to modern storage devices while also decreasing processing time otherwise observed when the track progression write scheme 208 is implemented in conjunction with a traditional (sequential, consecutive) LBA mapping.

Figure 3:
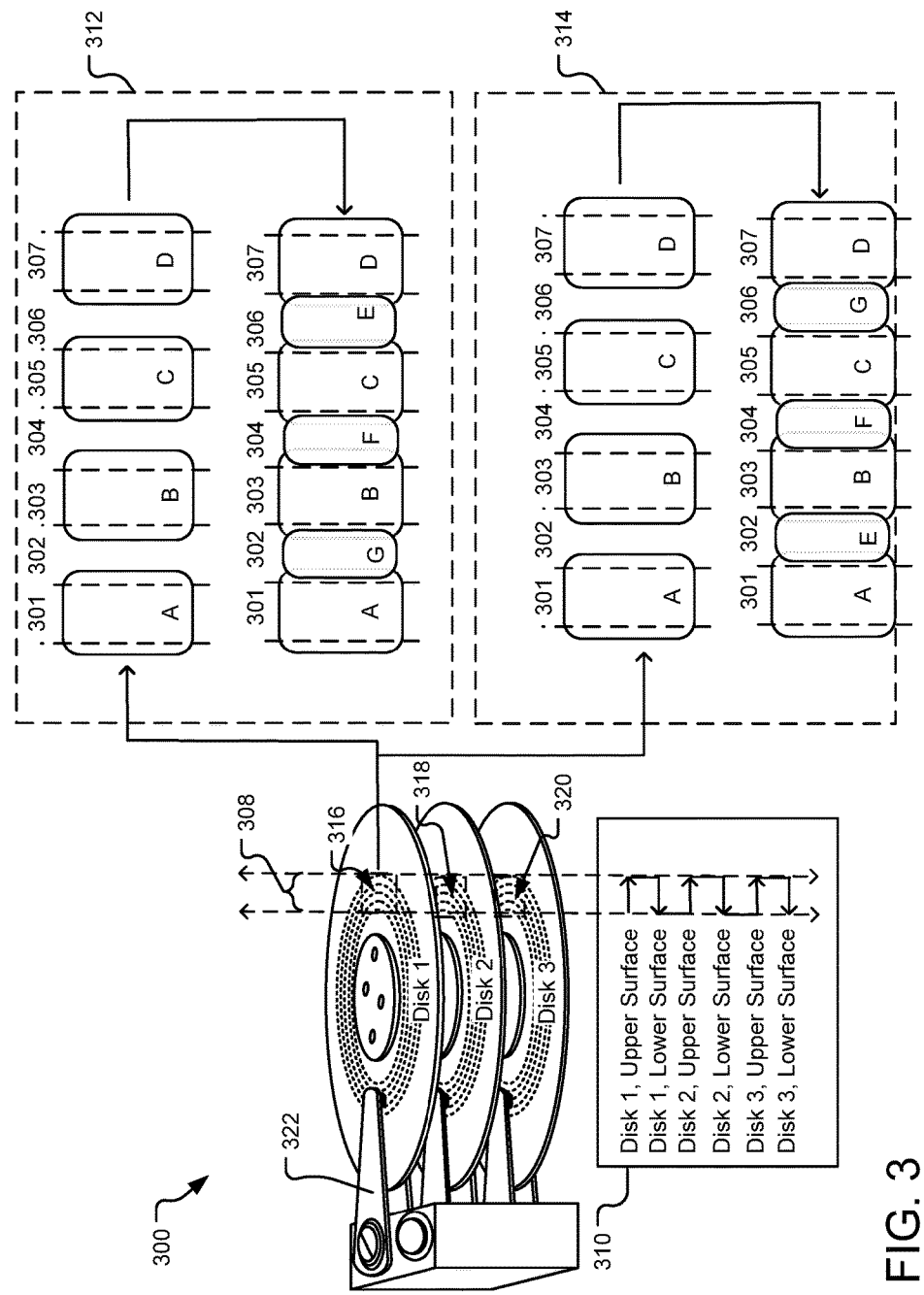
FIG. 3 illustrates a data storage device that implements an LBA mapping scheme designed to maximize write and/or read throughput of an IMR storage system.

FIG. 3 illustrates a data storage device 300 that implements an LBA mapping scheme designed to maximize write and/or read throughput of an IMR storage system. Although the data storage device 300 may be a variety of devices with diverse characteristics, the data storage device 300 is, in FIG. 3, a hard drive assembly including three disks that each have an upper and a lower data-storing surface. In one implementation, the data storage device 300 includes six different actuator arms (e.g., an actuator arm 322), each positioned to provide data access to a different surface of one of the three disks. A controller (not shown) of the IMR system 200 manages a mapping of physical storage space of the disks to LBAs of a host addressing scheme.

Physical storage space on each disk surface is divided into consecutive groupings of data tracks referred to herein as radial zones. Although FIG. 3 illustrates three exemplary like-positioned radial zones 316, 318, and 320, all user-writable tracks may be similarly quantized as other radial zones. According to one implementation, each of the radial zones (e.g., 316, 318, and 320) includes data blocks mapped to a range of consecutive LBAs. Within each individual one of the radials zones, the LBAs are mapped non-logically (e.g., non-consecutively) across contiguous data tracks. This mapping permits LBA sequence to be written logically in accord with an IMR track progression write scheme.

Exploded views 312 and 314 illustrate two alternative mappings of logical block addresses (LBAs) to physical block addresses (PBA) within the radial zone 316. Although each of the radial zones may include any number of data tracks, the radial zone 316 is shown to include seven data tracks: 301, 302, 303, 304, 305, 306, and 307. The odd-numbered tracks (301, 303, 305, and 307) are IMR bottom tracks, whereas the even-numbered data tracks (e.g., tracks 302, 304, and 306) are IMR top tracks. Specific characteristics of the IMR write scheme (e.g., track widths, linear densities, and track progression write rules) may be the same or similar to that described above with respect to FIG. 1.

In FIG. 3, alphabetical letters A-G each represent consecutive ranges of LBAs that are consecutive with one another when arranged according to an alphabetical sequence. For example, LBA range A may represent LBAs 0-511; LBA range B may represent LBAs 512-1023; LBA range C may represent LBA range 1024-1525; etc.

In the LBA mapping scheme of the exploded view 312, a first consecutive portion of an LBA sequence is mapped to the consecutive series of IMR bottom tracks 301, 303, 305, and 307, in order. Notably, these tracks are non-contiguous (e.g., the tracks do not share physical boundaries with one another). As a result of this mapping, the entire series of IMR bottom tracks in the radial zone 316 can be written in a consecutive track order according to a forward LBA progression, without performing an inter-layer seek coinciding with system changes to alter track width (e.g., re-loading of write parameters, altering a HAMR or MAMR power level, or switching between write heads).

In the exploded view 312, a second consecutive portion of the LBA sequence is mapped to the consecutive series of IMR top tracks (e.g., 306, 304, and 302, in order). Thus, the entire radial zone 316 can be written in-order by writing the consecutive series of IMR bottom tracks in order: 301, 303, 305, 307, and then by writing the consecutive series of IMR top tracks in a reverse order: 306, 304, and 302. As a result, the entire radial zone 316 is filled with data while the transducer head performs a two-pass "sweep of the zone" that includes a single inter-layer seek between the last IMR bottom track to receive data (e.g., the data track 307 including LBA range D) and the first IMR top data track to receive data (e.g., the data track 306 including LBA range E).

While slightly different than the above-described mapping scheme, the LBA mapping scheme shown in the exploded view 314 may yield similar performance improvements. Here, a first consecutive portion of the LBA sequence is mapped to the consecutive series of non-contiguous IMR bottom tracks (e.g., data tracks 301, 303, 305, and 307, in order), while a second consecutive portion of the LBA sequence is mapped to the consecutive series of IMR top tracks 302, 304, and 306. Thus, the LBA mapping of the IMR top tracks is in an opposite direction as that shown above with respect to exploded view 314. On a first pass through the radial zone 316, the transducer head moves from left-to-right and fills IMR bottom tracks consecutively. On the second pass through the radial zone 316, the transducer head moves from left-to-right again, filling the consecutive sequence of top IMR tracks.

Both of the LBA mapping schemes described above with respect to exploded views 312 and 314 may help to reduce total system processing time by mitigating inter-layer seek time and enabling logical reads and writes without violating rules of the IMR track progression write scheme.

In some systems, the above-described mapping within each radial zone is implemented within a framework that further quantizes LBA ranges in terms of "mini-zones." For example, FIG. 3 includes a mini-zone 308 defining collective group of like-positioned radial zones on the different surfaces of each disk included in the data storage device 300. The mini-zone 308 includes data tracks of each of six like-positioned radial zones (e.g., the radial zones 316, 318, and 320 on the upper surfaces of the three disks), as well as like-positioned radial zones on the lower surfaces (not shown) of each of the three disks. In one implementation, host LBAs are mapped logically to physical blocks of individual mini-zones such that the mini-zone 308 is mapped to a complete, consecutive range of LBAs. For example, the controller may direct logical writes in order of LBA to fill one mini-zone at a time, until the mini-zone is "full," before directing data to another different mini-zone.

Exemplary serpentine-like arrows in key 310 illustrate one exemplary mapping of an LBA range within the mini-zone 308, also sometimes referred to as "Serpentine" track progression. According to this example, a first portion of a consecutive sequence of LBAs is mapped to physical blocks within the radial zone 316 on an upper surface of disk 1; a second portion of the consecutive sequence is mapped to physical blocks within corresponding tracks on a lower surface (not shown) of disk 1; a third portion of the consecutive sequence is mapped to physical blocks in the radial zone 318 on the upper surface of disk 3; a fourth portion of the consecutive sequence is mapped to physical blocks within corresponding tracks on the lower surface (not shown) of disk 3; a fifth portion of the consecutive sequence is mapped to physical blocks within the radial zone 320 on the upper surface of disk 3; and a sixth portion of the consecutive sequence is mapped to physical blocks within corresponding tracks on the lower surface (not shown) of disk 3.

As described with respect to the exploded views 312 and 314, the LBA ranges may be mapped consecutively to non-contiguous data tracks within each radial zone included within the mini-zone 308. When this LBA mapping is affected within this mini-zone framework, processing efficiency of the data storage device 300 may be further improved due to additional observed reductions in cumulative seek times for an in-order write of data through an IMR mini-zone.

Figure 4:
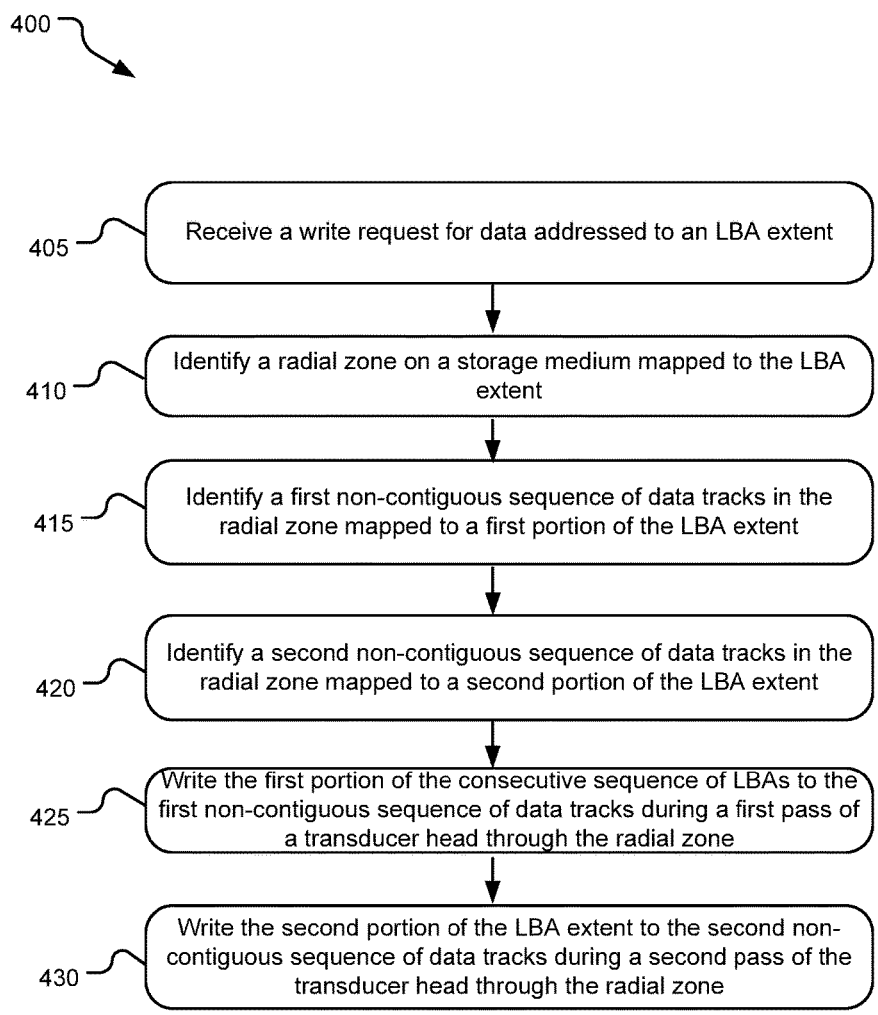
FIG. 4 illustrates example operations for maximizing write and/or read throughput for accessing data in an IMR system.

FIG. 4 illustrates example operations 400 for maximizing write and/or read throughput for accessing data in an IMR system. A receiving operation 405 receives a request to write data addressed to an LBA extent (i.e., a consecutive sequence of logical block addresses). Responsive to receipt of the write request, a first identifying operation 410 identifies a radial zone on a storage medium that includes physical data blocks corresponding to the LBA extent.

An identifying operation 415 identifies a first non-contiguous sequence of data tracks within the identified radial zone that are mapped to a first portion of the LBA extent. Another identifying operation 420 identifies a second non-contiguous sequence of data tracks within the identified radial zone that are mapped to a second (e.g., latter) portion of the LBA extent. In one implementation, the first non-contiguous sequence of data tracks includes a first series of alternating data tracks in the radial zone, while the second non-contiguous sequence of data tracks includes a second series of alternating data tracks interlaced with the first series of data tracks. For example, a first consecutive portion of the LBA sequence is mapped to IMR bottom tracks while a second consecutive portion of the LBA sequence is mapped to IMR top tracks.

A first sequential writing operation 425 writes the first portion of the LBA extent in-order to the first non-contiguous sequence of data tracks during a first pass of a transducer head through the radial zone. In one implementation, the series of non-contiguous tracks are written in a consecutive track order (e.g., from left-to-right or right-to-left). After the first portion of the LBA extent is written, a second writing operation 430 writes the second portion of the LBA extent in-order to the second non-contiguous sequence of data tracks during a second pass of a transducer head through the radial zone. After the second pass of the transducer head through the radial zone, the full sequence of LBAs have been recorded, in-order, without violating rules of the IMR track progression write scheme.

Figure 5:
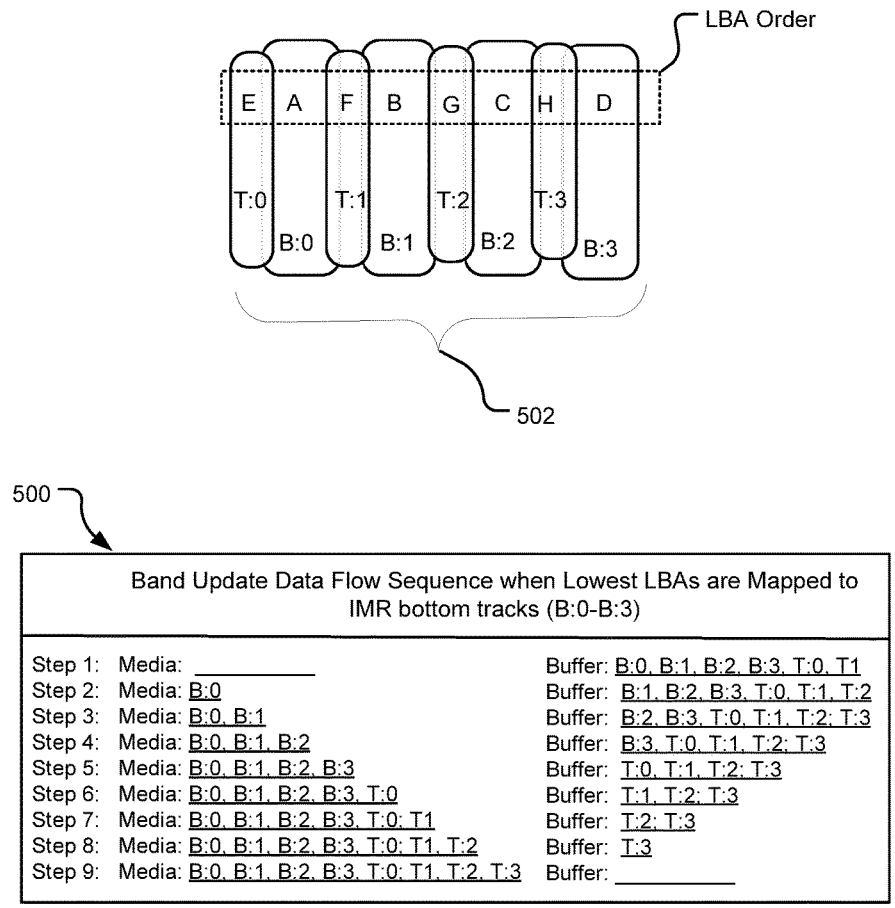
FIG. 5 illustrates an example data flow sequence performed by a storage controller when updating data stored in a data band of tracks in an IMR system.

FIG. 5 illustrates an example data flow sequence 500 performed by a storage controller when updating data stored within a data band 502 of an IMR system. The data band 502 includes exemplary IMR bottom tracks labeled B:0, B:1, B:2, and B:3 and exemplary IMR top tracks labeled T:0, T:1, T:2, and T:3. The IMR bottom tracks have a slightly wider written track width than the IMR top tracks, and the IMR top tracks are arranged to have edges slightly overlapping adjacent edges of IMR bottom tracks. For example, the top track T:1 has edges that overlap edges of the IMR bottom tracks B:0 and B:1.

In FIG. 5, alphabetical letters A through H (ABCDEFGH) are used to represent a consecutive logical block sequence that is mapped to the data band 502. A first consecutive portion of this sequence (ABCD) is mapped to consecutive IMR bottom tracks (B:0, B:1, B:2, and B:3), while a second consecutive portion of this sequence (EFGH) is mapped to consecutive IMR top tracks (T:0, T:1, T:2, T:3).

When writing data to the data band 502, an update to any one of the IMR bottom tracks (e.g., B:0) may corrupt data already-stored on the adjacent IMR top tracks (e.g., T:0 and T1). To prevent a loss of data, the storage controller postpones an update to the IMR bottom track B:0 until the new data of the two adjacent IMR top tracks (e.g., T:0 and T:1) is read into a memory buffer (hereinafter referred to as "memory buffer"). In different implementations, the memory buffer may be either non-volatile (e.g., Flash) or volatile (e.g., DRAM).

In the illustrated example, the storage device receives a write command to write new data to the entire data band 502. In response, storage controller performs a series of steps (e.g., steps 1-9) to update the data band 502 while ensuring that no IMR bottom track is written until the new data of the adjacent two IMR top tracks is read into the memory buffer. The data is received and written according to a consecutive LBA order.

As mentioned above, the storage controller implements logic to ensure that data of IMR top tracks T:0 and T:1 (LBAs E and F) resides in the memory buffer before the storage controller writes the data of track B:0 to the data band 502. At Step 1, the storage device accomplishes the foregoing by receiving incoming data of tracks B:0, B:1, B:2; B:3, T0; and T1 into the memory buffer. This data corresponds to a first consecutive portion of the LBA sequence (ABCDEF).

At step 2, the storage controller copies the data of track B:0 from the memory buffer to the corresponding track in the data band 502. This frees up storage space in the memory buffer, which allows data of the track T:2 to be stored into the memory buffer. After data of the track T:2 is in the memory buffer, the data of track B:1 is next copied to the data band from the memory buffer (at Step 3) (e.g., this is permitted because data of the adjacent tracks T:1 and T:2 are both stored in the memory buffer). After the data of track B:1 is written to the data band 502, data of the next track T:3 is stored into the memory buffer.

At Step 4, data of track B:2 is copied from the memory buffer to the data band 502 and data of the next track in the logical block sequence (track T:4, corresponding to LBA segment H) is stored into the memory buffer. In Steps 5-10, the storage controller continues to copy data from the memory buffer to the data band according to the LBA-consecutive order. Ultimately, the LBA segments are each written to the media according to the consecutive LBA order (ABCDEFGHI) and the corresponding track order B:0, B:1, B:2, B:3, T:0, T:1, T:2, T:3, and T:4.

Notably, the above-described write scenario is supported by a memory buffer that is configured to store at least N tracks at once, wherein N is equal to two more than the number of IMR bottom tracks in the data band 502. For example, the data band 502 has four IMR bottom tracks and the memory buffer stores a maximum of six tracks at once to prevent irreparable corruption of IMR top tracks data during the write operation. As detailed explained below, FIG. 6 illustrates another mapping and write scheme that may be supported by a smaller memory buffer than that described with respect to FIG. 5.

Figure 6:
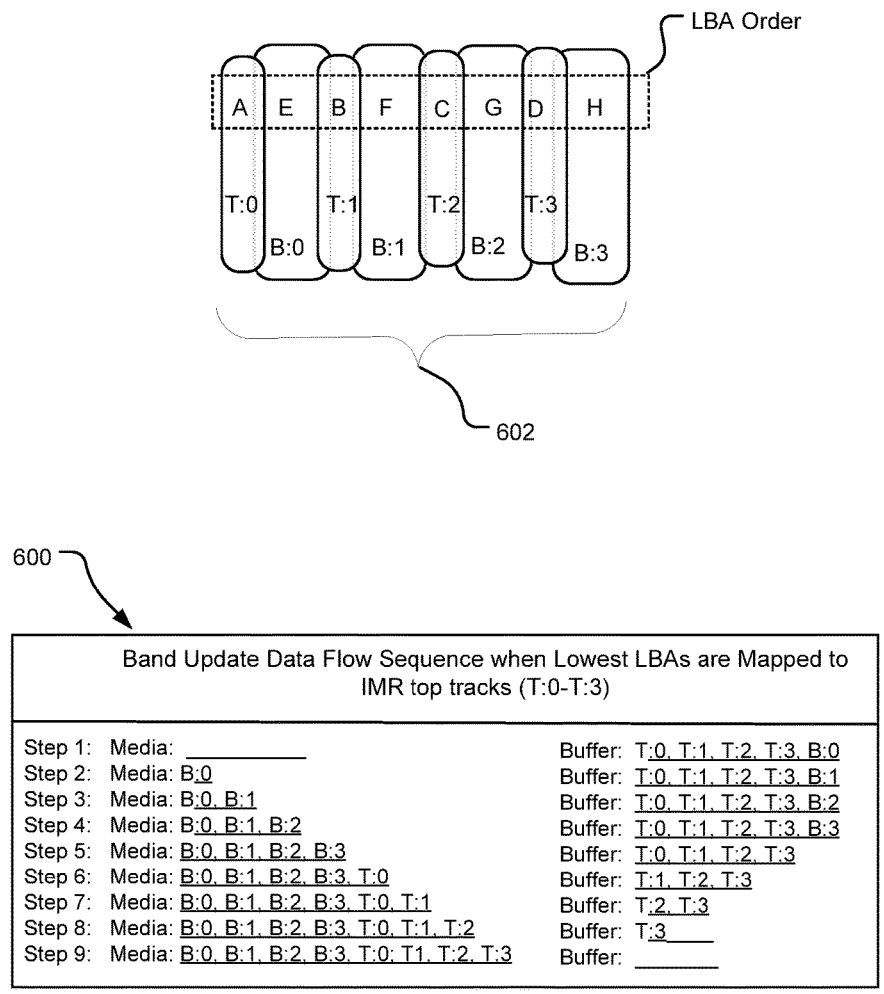
FIG. 6 illustrates another example data flow sequence 600 performed by a storage controller when updating data stored in a data band of tracks in an IMR system.

Specifically, FIG. 6 illustrates another example data flow sequence 600 performed by a storage controller when updating data stored in a data band 602 in an IMR system. In this example, a first consecutive portion of an LBA sequence (ABCD) is mapped to a consecutive series of IMR top tracks (T:0, T:1, T:2, T:3) in the data band 602. A second consecutive portion of the LBA sequence (EFGH) is mapped to a consecutive series of IMR bottom tracks (B:0, B:1, B:2, and B:3) in the data band 602. This differs from FIG. 5, wherein the lower portion of the LBA sequence is mapped to bottom IMR tracks instead of top IMR tracks.

Aside from these differences in LBA mapping, other aspects of the data band 602 or individual tracks therein may be the same or similar to that described above with respect to FIG. 5.

In the exemplary data flow sequence shown by FIG. 6, the storage controller receives a write command to re-write data of the data band 602. In response, storage controller performs a series of steps (e.g., steps 1-9) to update the data band while ensuring that no IMR bottom track is written unless the new data of the adjacent two IMR top tracks is stored in a non-volatile memory buffer (referred to as "memory buffer" below). The new data is received according to a consecutive LBA order; however, the data is written to the data band 602 according to a different order. In the example steps 1-9, an upper portion of the LBA sequence (EFGH) is written to data band 602 before a lower portion of the LBA sequence (ABCD).

Since this storage controller implements a track progression rule prohibiting data from being written to any IMR top track until data is first stored on the two contiguous (physically adjacent) IMR bottom data tracks, the storage controller is not able to write data to track T:0 (corresponding to LBA A) until after the corresponding data of track B:0 is already written to the data band 602. Moreover, to prevent a loss of data while writing to track B:0, it is important that the new data of the two adjacent IMR top tracks (e.g., T:0 and T:1) reside in the memory buffer during this write to track B:0.

At step 1, the storage device accomplishes the foregoing by receiving incoming data of tracks T:0, T;1, T:2, T:3, and B:0 into the memory buffer. This data corresponds to a first consecutive portion of the LBA sequence (ABCDE). Once data of track B:0 arrives in the memory buffer, this data is written to track B:0 in the data band 602 (see Step 2).

Following the write of data to track B:0, data of track B:1 is received into the memory buffer (at Step 2) and then immediately copied to the corresponding track in the data band 602 (at Step 3). Data of track B:2 is then received into the memory buffer (at step 3) and then immediately copied to the corresponding track in the data band 602 (at step 4). The same is performed for the data of track B:3 (at Step 5), and the data of top tracks T:0, T:1, T:2, and T:3 is next, in turn, copied from memory buffer to corresponding tracks in the data band according to the consecutive LBA order (at Steps 6-9).

Notably, the above-described write scenario is supported by a memory buffer that is configured to store at least M tracks at once, wherein M is equal to one more than the number of IMR bottom tracks in the data band For example, the data band 602 has four bottom tracks and the memory buffer stores a maximum of five tracks at once to prevent irreparable corruption of IMR top track data during the write operation.

In contrast with the data mapping and write scheme shown in FIG. 5, the illustrated process can be performed to write the same amount of data to the media while utilizing fewer processing and storage resources.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
   receiving a request to write data to a consecutive sequence of logical block addresses (LBAs);
   identifying a first non-contiguous sequence of data tracks mapped to a first portion of the consecutive sequence of LBAs;
   identifying a second non-contiguous sequence of data tracks mapped to a second portion of the consecutive sequence of LBAs, the second portion sequentially following the first portion; and
   writing the data of the second portion of the consecutive sequence of LBAs to the first non-contiguous sequence of data tracks during a first pass of a transducer head through a radial zone and writing the data of the first portion of the consecutive sequence of LBAs to the second non-contiguous sequence of data tracks during a second, subsequent pass of the transducer head through the radial zone.

2. The method of claim 1, further comprising:
   storing the first portion of the consecutive sequence of LBAs in a memory buffer while writing the second portion of the consecutive sequence of LBAs to the first non-contiguous sequence of data tracks.

3. The method of claim 2, wherein the memory buffer is configured to store data of N+1 tracks during the first pass of the transducer head through the radial zone, wherein N represents a number of tracks in the second non-contiguous sequence of data tracks.

4. The method of claim 1, wherein the first non-contiguous sequence of tracks includes a first set of alternating data tracks in a radial zone and excludes a second set of alternating data tracks interlaced with the first set of alternating data tracks.

5. The method of claim 4, wherein the second non-contiguous sequence of tracks includes the second set of alternating data tracks interlaced with the first set of alternating data tracks.

6. The method of claim 5, wherein the first non-contiguous sequence of data tracks each have a wider written track width than data tracks of the second non-contiguous sequence of data tracks.

7. The method of claim 5, wherein the first non-contiguous sequence of data tracks storing data at a higher linear density than data tracks of the second non-contiguous sequence of data tracks.

8. A storage device comprising:
a storage medium; and
a controller configured to:
receive a request to write data to a consecutive sequence of logical block addresses (LBAs);
identify a first non-contiguous sequence of data tracks mapped to a first portion of the consecutive sequence of LBAs;
identify a second non-contiguous sequence of data tracks mapped to a second portion of the consecutive sequence of LBAs, the second portion sequentially following the first portion; and
write the data of the second portion of the consecutive sequence of LBAs to the first non-contiguous sequence of data tracks during a first pass of a transducer head through a radial zone and writing the data of the first portion of the consecutive sequence of LBAs to the second non-contiguous sequence of data tracks during a second, subsequent pass of the transducer head through the radial zone.

9. The storage device of claim 8, wherein the controller is further configured to store the first portion of the consecutive LBA sequence in a memory buffer while writing the second portion of the consecutive LBA sequence to the first non-contiguous sequence of data tracks.

10. The storage device of claim 9, wherein the memory buffer is configured to store data of N+1 tracks during the first pass of the transducer head through the radial zone, wherein N represents a number of tracks in the second non-contiguous sequence.

11. The storage device of claim 8, wherein the first non-contiguous sequence of tracks includes a first set of alternating data tracks in a radial zone and excludes a second set of alternating data tracks interlaced with the first set of alternating data tracks.

12. The storage device of claim 11, wherein the second non-contiguous sequence of tracks includes the second set of alternating data tracks interlaced with the first set of alternating data tracks.

13. The storage of claim 8, wherein the first non-contiguous sequence of data tracks each have a wider written track width than data tracks of the second non-contiguous sequence of data tracks.

14. The storage device of claim 8, wherein the first non-contiguous sequence of data tracks storing data at a higher linear density than data tracks of the second non-contiguous sequence of data tracks.

15. One or more memory devices encoding computer-executable instructions for executing on a computer system a computer process, the computer process comprising:
receiving a request to write data to a consecutive sequence of logical block addresses (LBAs);
identifying a first non-contiguous sequence of data tracks mapped to a first portion of the consecutive sequence of LBAs;
identifying a second non-contiguous sequence of data tracks mapped to a second portion of the consecutive sequence of LBAs, the second portion sequentially following the first portion; and
writing the data of the second portion of the consecutive sequence of LBAs to the first non-contiguous sequence of data tracks during a first pass of a transducer head through a radial zone and writing the data of the first portion of the consecutive sequence of LBAs to the second non-contiguous sequence of data tracks during a second, subsequent pass of the transducer head through the radial zone.

16. The one or more memory devices of claim 15, storing the first portion of the consecutive sequence of LBAs in a memory buffer while writing the second portion of the consecutive sequence of LBAs to the first non-contiguous sequence of data tracks.

17. The one or more memory devices of claim 16, wherein the memory buffer is configured to store data of N+1 tracks during the first pass of the transducer head through the radial zone, wherein N represents a number of tracks in the second non-contiguous sequence.

18. The one or more memory devices of claim 15, wherein the first non-contiguous sequence of tracks includes a first set of alternating data tracks in the radial zone and excludes a second set of alternating data tracks interlaced with the first set of alternating data tracks.

19. The one or more memory devices of claim 18, wherein the second non-contiguous sequence of tracks includes the second set of alternating data tracks interlaced with the first set of alternating data tracks.

20. The one or more memory devices of claim 15, wherein the first non-contiguous sequence of data tracks each have a wider written track width than data tracks of the second non-contiguous sequence of data tracks.

* * * * *